Figure 1:
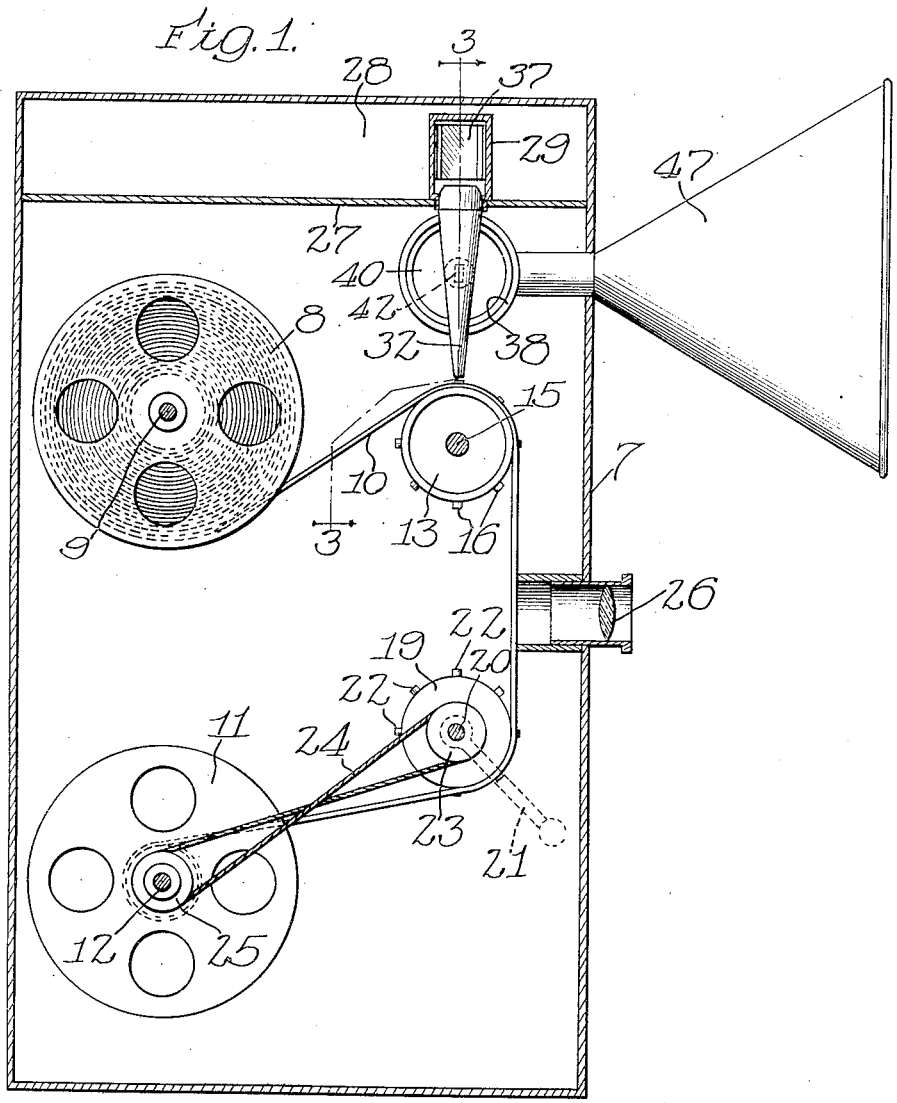

H. B. BYRON.
METHOD OF MAKING PHONOGRAPHIC RECORDS.
APPLICATION FILED FEB. 19, 1912.

1,185,056.

Patented May 30, 1916.
2 SHEETS—SHEET 1.

Witnesses:
H. W. Domarus Jr.
R. Burkhardt.

Inventor:
Hagar Bolton Byron,
by Bond Adams Pickard Jackson
Attys.

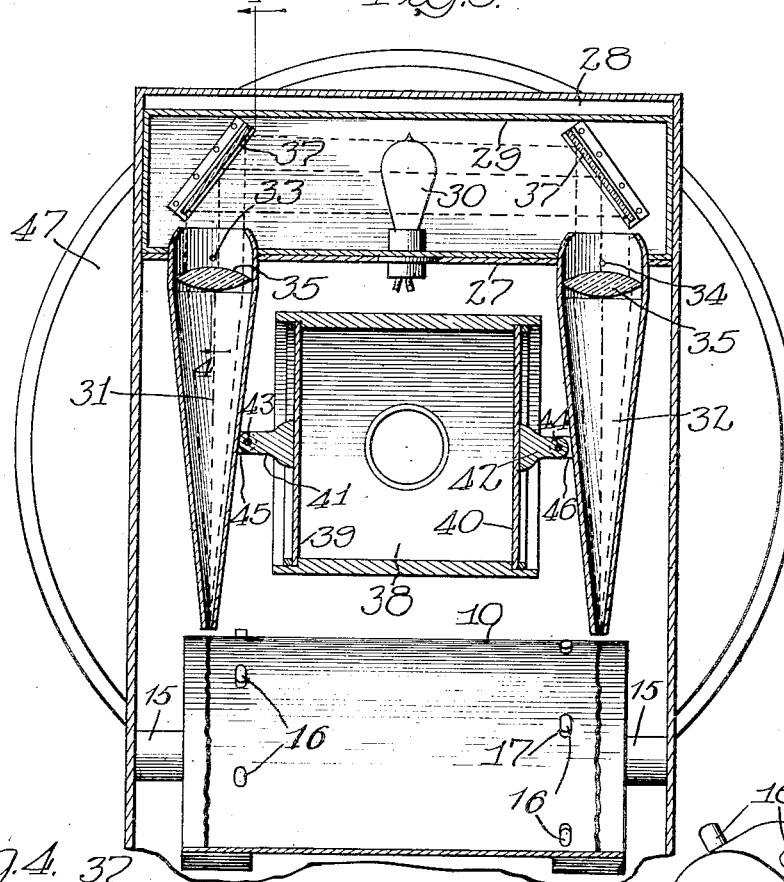

UNITED STATES PATENT OFFICE.

HAGAR BOLTON BYRON, OF CHICAGO, ILLINOIS, ASSIGNOR, BY MESNE ASSIGNMENTS, OF ONE-THIRD TO A. H. ADAMS, ADA E. PICKARD, AND J. L. JACKSON, OF CHICAGO, ILLINOIS.

METHOD OF MAKING PHONOGRAPHIC RECORDS.

1,185,056.  Specification of Letters Patent.  Patented May 30, 1916.

Application filed February 19, 1912. Serial No. 678,610.

*To all whom it may concern:*

Be it known that I, HAGAR BOLTON BYRON, a citizen of the United States, residing at Chicago, in the county of Cook and State of Illinois, have invented a certain new and Improved Method of Making Phonographic Records, of which the following is a specification, reference being had to the accompanying drawings.

My invention relates to the art of making phonographic records for the reproduction of sounds, and has for its object to provide a new and improved method by which continuous records of any desired length may be made having one or more grooves corresponding with the sound waves to be reproduced; also to provide for making such sound grooves by photography and thus make practicable the simultaneous making of sound records and photographic records on the same medium, such as a flexible film, thereby insuring perfect synchronism. I accomplish these objects as illustrated in the drawings and as hereinafter described.

What I regard as new is set forth in the claims.

Figure 2:
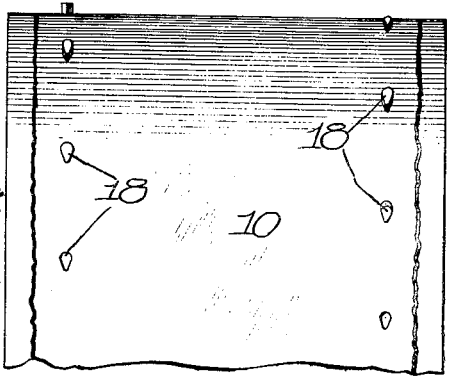

In the accompanying drawings,—Figure 1 is a vertical sectional view showing one form of apparatus that may be conveniently employed for photographing sound waves upon a continuous film and at the same time photographing views thereon; Fig. 2 is an enlarged detail, showing the face view of a portion of a combined phonographic and kinetographic record as made by such apparatus; Fig. 3 is an enlarged detail, being a partial vertical cross-section on line 3—3 of Fig. 1; Fig. 4 is an enlarged detail, being a partial vertical section on line 4—4 of Fig. 3; Fig. 5 is a perspective view of the guide wheels and shaft; and Fig. 6 is a cross-section of the finished record.

My invention contemplates the exposure of a sensitive ribbon or film to the action of light so that when developed it will form a negative of the sounds to be reproduced, the latter being manifested in the form of lateral wave lines corresponding to the sound waves accompanying the exposure. In the best form of my invention, two sound wave lines are produced near the opposite margins of the film, which in the embodiment illustrated are thickened, but my invention is not restricted to making two of such wave lines, as one will suffice, although the results will not be as satisfactory as if two of such wave lines are made. By providing two sound wave lines one will be apt to make up for any deficiency in the other, so that uniformly good results will be obtained, and moreover, the life of the film is prolonged, as the wear upon each sound wave line is not as great, since they coöperate in sound reproduction. After the development of the film in the usual way, a positive film is produced from it, in which, of course, the lights and shadows are reversed, the sound wave lines being unaffected by the light. In making this positive film, when a combined kinetographic and phonographic record is to be produced, I employ a film the intermediate portion of which is sensitized in the same way as the ordinary photographic film, while its margins are coated with a soluble composition capable of being hardened or rendered water-insoluble by the action of light, such as an emulsion composed of one-fifth gelatin, one-fifth bichromate of potash, and three-fifths gum arabic. These proportions may, however, be varied, and instead of the composition mentioned any other composition suitable for the purpose may be employed. This film having the marginal zones described is exposed to light under the negative film in the usual way, and is then developed, fixed and washed according to the procedure usually followed with kinetographic films. Those portions of the marginal zones which are exposed to light become insoluble, but the portions underlying the negative sound wave lines, being unaffected by the light, remain soluble in water and are consequently dissolved and washed away in the finishing of the film, as described, thereby leaving channels or grooves which correspond exactly with the sinuosities of the negative sound wave lines and are capable of sound reproduction by the use of any suitable phonographic reproducing apparatus operating by lateral vibration, such as that used in the instrument known as the "gramophone", or other similar devices operating on disk records. These thickened marginal portions of the film also serve another purpose in that the film is thus provided with a depressed intermediate portion which receives the kinetographic picture records, which, by this means are protected from pressure when the film is rolled on the spool or reel, thereby protecting them from abrasion or scratching. This feature is, however, not herein claimed, but is reserved for incorporation in a separate application. The combined kinetographic and phonographic record when used for reproduction purposes, is run through an apparatus having phonographic reproducing means and picture projecting mechanism arranged in the same relative positions as in the apparatus used in making the negative, so that the sounds and views are reproduced with perfect synchronism. It will be understood, of course, that the method described may be used for producing sound records only as well as for producing combined kinetographic and phonographic records.

Referring now to the drawings for a description of the apparatus therein shown,— 7 indicates a camera or light-proof box of suitable size and shape to inclose the reels on which the film is wound, and the sound-reproducing apparatus.

8 indicates a reel mounted on a suitable shaft 9, said reel being designed to carry the unexposed film.

10 indicates the negative film, and 11 indicates the rewinding reel mounted on a shaft 12.

13 indicates a pair of guide pulleys mounted on a shaft 15 and arranged adjacent to the reel 8, the shaft 15 being parallel with the shaft 9. The pulleys 13 are provided on their upper surface with a series of pins or sprockets 16 which engage perforations 17 near the margins of the film 10. For the purpose of insuring proper registration of the film, the perforations 17 are rounded at their forward margins and preferably are made elliptical, and the sprockets 16 are correspondingly shaped. If desired, said perforations may be made more or less kite-shaped, with rounded apices at the front or leading portions thereof, as shown at 18 in Fig. 2. The purpose of this arrangement is to provide against lateral movement of the film, since by making the perforations round or somewhat V-shaped at their forward or leading portions and operating them by correspondingly shaped sprockets, the film is held against lateral displacement and its proper alinement is maintained.

19 indicates a pair of drive-wheels similar to the pulleys 13 and mounted on a shaft 20 parallel with the shaft 15. The shaft 20 extends through one side of the camera 7 and is provided with a crank 21 for rotating it. The wheels 19 also have sprockets 22 similar to the sprockets 16. In order to secure a more uniform movement of the film under the action of the drive-wheels 19, the sprockets on the two wheels of each pair, are staggered with relation to each other, and the perforations in the opposite marginal portions of the film bear a staggered relation to each other, as shown in Fig. 3. The shaft 20 is also provided with a pulley 23 connected by any suitable belt 24 with a pulley 25 on the shaft 12 of the rewinding reel 11. By this construction by rotating the drive-wheels 19 by means of the crank 21, the film 10 is unrolled from the reel 18, and after passing around the pulleys 13 and the drive-wheels 19, is rewound on the reel 11.

26 indicates a conventional representation of a photographic lens arranged adjacent to that part of the film extending between the pulleys 13 and drive-wheels 19. It will be understood that the lens 26 is provided with the usual shutter mechanism required for kinetographic work. The lens is preferably one having the construction shown and described in my application filed Feb. 16, 1912, Serial No. 677,233 for method of and apparatus for producing a round or relief effect by photography.

27 indicates a partition which extends across the upper portion of the camera 7, forming an upper compartment 28.

29 indicates a box or housing which is arranged in the compartment 28 and extends transversely thereof at a point centrally over the pulleys 13. Said box is light tight and contains an incandescent lamp 30, or other suitable source of light.

31—32 indicate two funnel-shaped tubes, the upper and larger ends of which extend up through the partition 27 into the box 29 near the ends thereof and are pivotally mounted on pivots 33—34 which are arranged to permit the tubes 31—32 to swing transversely of the camera. The tubes 31—32 are tapered practically to a point at their lower ends so as to leave a minute passage at their lower ends, the arrangement being such that such passages lie over and adjacent to the marginal portions of the film, as best shown in Fig. 3. In the illustration the lower ends of the tubes 31—32 are shown as somewhat removed from the film for clearness of illustration, but in practice they approximate very closely to the film. The tubes 31—32 are provided at their upper ends with lenses 35, the purpose of which is to focus the light at the lower ends of the tubes.

37 indicates mirrors mounted at the ends of the box 29 in oppositely-inclined positions so as to reflect the light coming from the lamp 30 upon the upper surfaces of the lenses 35, as indicated by dotted lines in Fig. 3. By this construction the light coming from the lamp 30 is concentrated and directed upon the marginal portions of the film 10 so that if the tubes 31—32 were allowed to remain stationary the movement of the film 10 through the camera would result in exposing the marginal portions of the film to light along two straight lines, which would show black on the developed negative. In order, however, to make these lines of exposure correspond with sound waves, the tubes 31—32 are caused to swing sidewise in conformity to sound wave vibrations and so correspondingly modify the contour of the lines in the marginal portions of the film caused by the exposure. For this purpose, I employ a sound box 38 placed between the tubes 31—32 and having at its ends vibrating diaphragms 39—40 which are connected, respectively, with the tubes 31—32. In the construction illustrated these connections are made by means of bosses 41—42 secured to the diaphragms 39—40, respectively, and connected by pivots 43—44 with lugs 45—46 carried by the tubes 31—32, respectively, as shown in Fig. 3.

47 indicates a horn connected with the sound-box 38. Thus the vibrations of the diaphragms 39—40 under the action of sound waves cause a corresponding vibration or movement of the tubes 31—32, which is magnified because of the projection of said tubes below the point of their connection with the diaphragms. This effects the vibration of the beams of light directed upon the marginal portions of the film so that the exposures thereof correspond exactly in outline with the sound waves which produce them. After the negative film has been exposed, it is developed in the usual way and is then used to make a positive film in the manner already described.

As shown in Fig. 6, the positive film 14, when completed, has the photographic views on the intermediate sunken portion and phonographic record grooves 48 in its marginal portions, the latter being susceptible of reproducing sound by lateral vibrations of a reproducing needle in the ordinary way. The apparatus for reproducing the sound may be similar to the record making apparatus, except that needles are substituted for the tubes 31—32, but any approved reproducing apparatus may be employed.

While my invention is peculiarly applicable to the production of combined kinetographic and phonographic records, it is equally applicable to the reproduction of sound records only, in which case the films would be of appropriate dimensions and the apparatus employed would also be suitably modified.

That which I claim as my invention, and desire to secure by Letters Patent, is,—

1. The method of making sound records, which consists in forming a negative wave line corresponding with sound waves, by photography, making a positive from such negative on a separate film capable of being hardened by the action of light, and removing the unexposed material.

2. The method of making sound records, which consists in forming a negative wave line corresponding with sound waves, by photography, making a positive from such negative on a separate film composed of a gelatin emulsion containing bichromate of potash, and then removing the unexposed material to form a groove corresponding with the sound wave line.

3. The method of making sound records, which consists in forming a negative wave line corresponding with sound waves, by photography, making a positive from such negative on a separate film composed of an emulsion composed of gelatin, gum arabic and bichromate of potash, and then removing the unexposed material to form a groove corresponding with the sound wave line.

4. The method of making sound records, which consists in forming a negative wave line by photography, corresponding with sound waves, then forming from the negative a positive record by printing on a separate film having a marginal zone composed of material capable of being hardened by the action of light, and then removing the unexposed material.

5. The method of making sound records, which consists in kinetographically producing upon a moving film a negative wave line corresponding with sound waves, and then forming a positive record from such negative film by printing therefrom upon a separate film capable of being hardened by the action of light, and removing the unexposed material.

HAGAR BOLTON BYRON.

Witnesses:
JOHN L. JACKSON,
MINNIE A. HUNTER.